FIG. 1

March 9, 1948.   L. J. KOCI   2,437,392
SYNCHRONOUS DRIVING APPARATUS
Filed Oct. 27, 1944   3 Sheets-Sheet 2

INVENTOR
LUDVIK J. KOCI
BY
McKenna & Morsbach
ATTORNEYS

March 9, 1948.  L. J. KOCI  2,437,392
SYNCHRONOUS DRIVING APPARATUS
Filed Oct. 27, 1944   3 Sheets-Sheet 3

FIG. 4

INVENTOR.
LUDVIK J. KOCI

ATTORNEYS

Patented Mar. 9, 1948

2,437,392

UNITED STATES PATENT OFFICE 2,437,392

SYNCHRONOUS DRIVING APPARATUS

Ludvik J. Koci, Chicago, Ill., assignor to Sunbeam Corporation, Chicago, Ill., a corporation of Illinois Application October 27, 1944, Serial No. 560,701

11 Claims. (Cl. 172—293)

The present invention relates to driving apparatus and more particularly to improved apparatus for driving a rotatable element at any one of a plurality of stabilized synchronous speeds.

Many applications require the use of facilities for driving a rotatable shaft or like element precisely and accurately at any one of a plurality of different speeds. In the usual application of this character, rapid changes from one speed to a different speed within the over-all speed range of the shaft are desirable if not essential, and the highest speed of the speed range may exceed by many times the lowest speed of the range. Thus in the calibration of aircraft tachometers, point by point calibration is resorted to, which requires observation of the readings obtained at various points over the indicating range of the instrument when the instrument is excited by a variable frequency alternator having an output frequency which is known and precisely maintained at each calibrating point. This involves driving the variable speed alternator with precision accuracy at a large number of different speeds which may be relatively closely spaced over the speed range required for full scale calibration of the instrument. Conventional speed control facilities of the character used in conjunction with variable or adjustable speed motors, are not sufficiently accurate for calibration work of the character referred to even at one speed, much less at each of several speeds within a wide speed range. Conventional synchronous equipment is likewise not well adapted for use in applications of the character mentioned, due to the difficulties encountered in obtaining the large number of synchronous speeds and in changing from one speed to a different speed.

It is an object of the present invention, therefore, to provide improved apparatus for driving a rotatable element precisely and accurately at a predetermined speed.

It is another object of the invention to provide improved apparatus for operating a rotatable element exactly at any one of a plurality of synchronous speeds within a wide speed range.

It is a further object of the invention to provide an improved and simple synchronizing device which may be easily and reliably operated to sustain synchronous operation of a rotatable element at a predetermined base speed or any one of a large number of integer multiples of the base speed.

It is a still further object of the invention to provide improved facilities for minimizing transient and oscillatory changes in the speed of the rotatable element and for preventing the synchronizing device from dropping out of synchronism with the periodic current pulses employed in sustaining synchronous operation of the device.

The invention, both as to its organization and method of operation, together with further objects and advantages thereof will best be understood by reference to the following specification taken in connection with the accompanying drawings in which:

Figure 1:
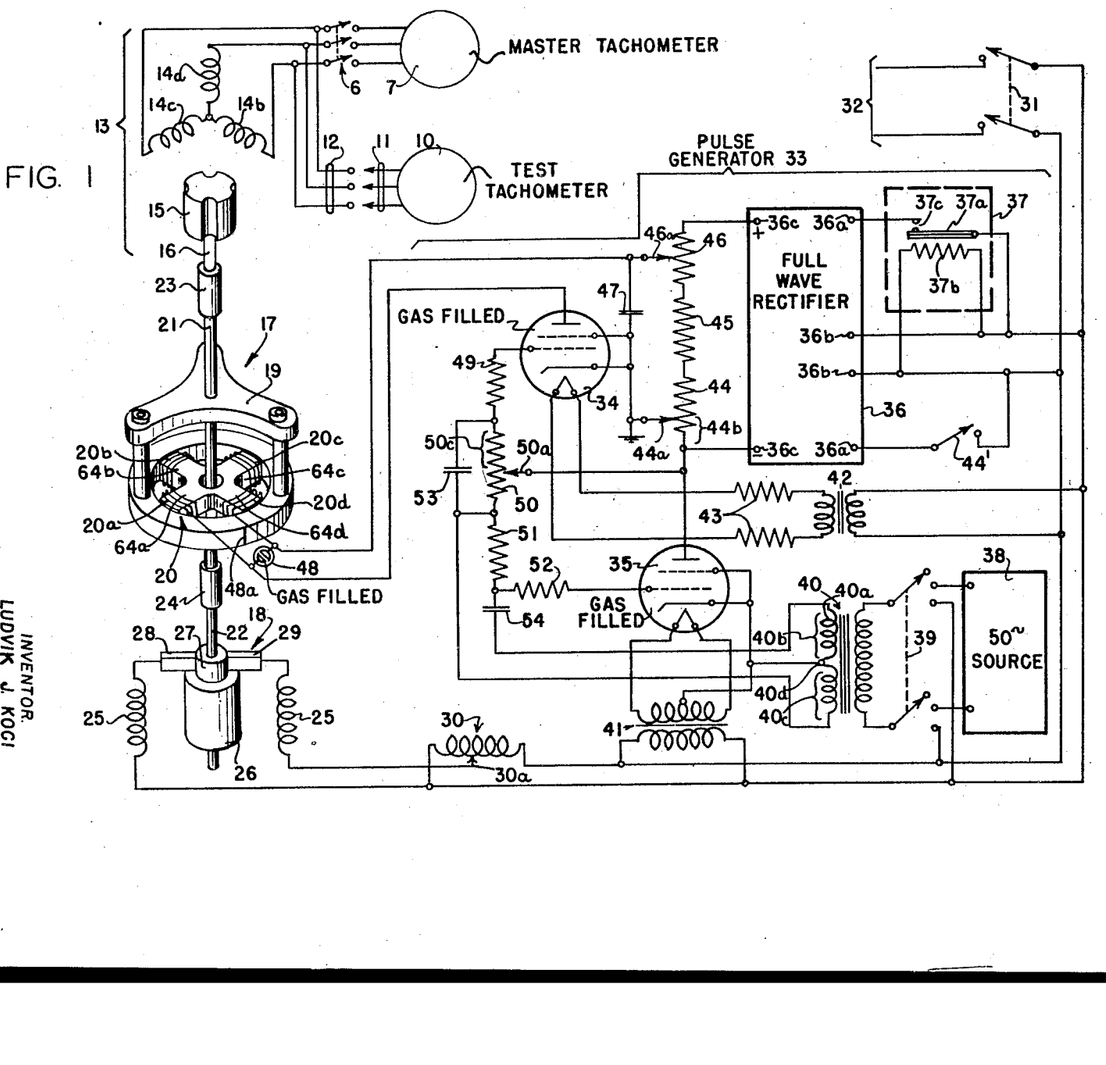
Fig. 1 diagrammatically illustrates improved driving apparatus characterized by the features of the present invention.

Referring now to the drawings and more particularly to Fig. 1 thereof, the present improved multi-synchronous speed driving equipment is illustrated as being provided to drive at any one of a plurality of predetermined synchronous speeds a small three-phase alternator 13, the output voltage of which may be delivered to the windings of a speed tachometer 10 for the purpose of calibrating this tachometer over the full speed range thereof. The windings of the three-phase synchronous driving motor embodied in the test tachometer 10 may be connected for energization from the alternator 13 through a plug and socket connection which comprises a plug 11 terminating the conductors of the cord extending to the tachometer 10 and engageable with a socket 12, the contacts of which are connected to the three terminals of the generator 13. For the purpose of indicating the speed which the test tachometer 10 should register at any selected operating speed of the alternator 13, a master tachometer 7 is provided which includes a synchronous driving motor, the windings of which may be connected for energization from the alternator 13 through the contacts of a three-phase switch 6. It will be understood that the master tachometer 7 is at all times maintained in sufficiently accurate calibration so that the speed indications provided thereby over the full speed range thereof may be relied upon to indicate the indication which the test tachometer 10 should produce for any selected speed of operation of the alternator 13, i. e., to indicate the particular calibration speed.

The alternator 13 may be of any desired commercial construction. It is illustrated as comprising three star connected windings 14a, 14b and 14c which are carried by the stator structure of the generator and are excited through rotation of a four-pole rotor structure which includes a permanent field magnet 15 formed of Alnico or the like and having alternate north and south magnetic poles around the periphery thereof. This magnet is carried by a rotor shaft 16 through which it may be driven by the synchronous driving equipment described below. Since the alternator 13 is of the four-pole type, it will be understood that the output frequency of the generator is a direct function of twice the speed of rotation of the field magnet 15.

Tachometers of the character schematically illustrated at 7 and 10 are conventionally employed in aircraft for the purpose of indicating engine or propeller speed. To that end, an alternator similar to the alternator 13 is coupled to the propeller or engine shaft to deliver a three-phase voltage to the synchronous motor of the associated tachometer having a frequency which varies directly with the speed of rotation of the engine or propeller shaft. In the usual arrangement, the alternator is driven at one-half the engine or propeller speed, and thus since the alternator is of the four pole type, the frequency of its output voltage is numerically equal to the engine speed. Further, a tachometer of the character referred to conventionally has a speed range extending from zero to a maximum speed of 4500 revolutions per minute. In order, therefore, accurately to calibrate a tachometer of this character over its full speed range, it is necessary to drive the alternator 13 synchronously at a large number of different speeds which respectively correspond to different speed indicating points over the speed range of the tachometer under test.

It is to this end that the present improved synchronous driving equipment is provided. In brief, this equipment comprises an adjustable speed alternating current motor 18 of the well-known series type having its power output shaft 22 connected to drive the rotor shaft 16 of the alternator 13 through the rotor structure 19 of a synchronizing device 17. Specifically, the rotor shaft 22 of the motor 18 is directly coupled to the rotor shaft 21 of the synchronizing device 17 through a coupling sleeve 24, and the rotor shaft 21 is directly coupled to the rotor drive 16 of the alternator 13 through a coupling sleeve 23. The field windings 25 and the windings of the rotor 26 embodied in the motor 18 are arranged for energization from a 60-cycle alternating-current source indicated by the bracketed terminals 32 through the contacts of an on-off switch 31 and the winding of a speed adjusting auto-transformer 30, current being supplied to the windings of the rotor 26 through a brush and commutator structure which comprises the commutator 27 and a pair of brushes 28 and 29. It will thus be understood that when the switch 31 is closed, the motor 18 may be operated to deliver power to the rotor shaft 16 of the alternator 13, and to continuously vary the speed of the latter by suitably adjusting the voltage take-off tap 30a along the winding of the auto-transformer 30. Inherently, however, the motor 18 is a non-synchronous device in that it is incapable of maintaining a constant speed of operation over an extended period during which the load imposed thereon, and the voltage applied thereto may vary within relatively wide limits. It is for this reason that the synchronizing device 17 is provided in the driving connection between the motor 18 and the rotor shaft 16 of the alternator 13, this device having the function of supplying the required decelerating or accelerating synchronizing torque to maintain the rotor at any one of a plurality of predetermined and precisely known speeds within the operating speed range of the alternator 13.

More specifically the synchronizing torque is developed by the synchronizing device 17 through periodic energization of the winding 64 carried by the stator structure 20 thereof from a synchronous pulse generator 33. Briefly considered, this pulse generator comprises a pulse power tube 34, the space current path of which is connected in series with the stator winding 64 across a relatively large condenser 47. In order to provide a stroboscopic indication that the rotor structure of the device 17 is operating at a predetermined synchronous speed, a neon tube 48 is bridged across the winding 48 to be energized in parallel therewith. This tube is positioned adjacent the periphery of the rotor structure to illuminate line indications 48a provided at appropriate points around the rotor structure periphery when energized. The condenser 47 is arranged to be charged from a resistor network comprising the three series connected resistors 44, 45 and 46, which are bridged across the output terminals 36c of a full wave rectifier 36 having plate or anode transformer current supply terminals 36a and filament transformer input terminals 36b. The latter terminals are connected for direct energization from the source 32 through the contacts of the switch 31, whereas the supply terminals 36a are arranged to be connected to this source through an on-off switch 44 and the contacts of a thermal time delay relay 37. This relay comprises a pair of contacts 37c serially included in the anode transformer current supply circuit of the rectifier 36 and adapted to be engaged through movement of a specially compensating bi-metallic strip 37a to which heat is delivered from a heating coil 37b connected for energization from the source 32 when the switch 31 is closed.

The tube 34 is of the well-known thyratron type, such that a conductive space current path is provided therethrough only when both the anode and control grid thereof are at potentials more positive than given critical values with respect to the cathode thereof. Specifically, this tube is of the FG-95 type. Normally the control grid of the tube 34 is maintained at a potential somewhat negative with respect to the cathode thereof over a biasing circuit which includes the adjustable portion 44b of the resistor 44, the portion 50c of a resistor 50 and the grid current limiting resistor 49. The negative bias voltage thus impressed between the grid and cathode of the tube 34 is obviously equal to the voltage drop across the adjustable section 44b of the resistor 44. This voltage is set at the lowest value which will prevent space current flow through the tube 34 in the absence of a bucking voltage in the biasing circuit, by suitable adjustment of the contact 44a along the resistor 44. Heating current is delivered to the cathode heater of the tube 34 from the source 32 through a voltage dropping transformer 42 and a pair of current limiting resistors 43.

Sharply peaked triggering voltage pulses are introduced into the grid biasing circuit of the tube 34 at periodically spaced intervals through the action of a triggering circuit which comprises a four-electrode thyratron tube 45 of the GL–502 type. This circuit may be excited either from a very precise 50-cycle source of alternating voltage indicated generally at 38 or from the 60-cycle voltage source 32 through a voltage step-down transformer 40 and the contacts of a three-position selector switch 39. The 50-cycle voltage generator 38 may be of the tuning fork controlled type, such, for example, as the type 816A precision fork generator commercially manufactured by the General Radio Company. More specifically considered, the outer terminals of the transformer secondary winding 40a are bridged across the elements 51 and 54 of an R–C phase-shifting network, the junction point of which is connected to the grid of the tube 35 through a grid current limiting resistor 52. The lower terminal of the secondary winding 40a is connected to the anode of the tube, and the center tap 40d of this winding is connected directly to the cathode of the tube, so that the voltage appearing across the winding section 40c is impressed between the anode and cathode of the tube. Heating current is delivered to the cathode heater of this tube through a voltage step-down transformer 41, the primary of which is bridged across the conductors extending through the switch 31 to the current source 32.

Since the tube 35 is of the thyratron type, it will only conduct space current when both the control grid and anode thereof are at potentials more positive than given critical values relative to the cathode thereof. The described circuit arrangement is for the purpose of causing this tube to conduct only during a small fraction of each alternate half-cycle of the voltage appearing across the secondary winding 40a of the transformer 40. The manner in which this is accomplished is explained at pages 190, 191 and 192 of the book entitled "Electron Tubes in Industry," authored by Keith Henney and published by the McGraw-Hill Book Company, Inc., in 1937. Briefly to analyze the circuit, it will be noted that relative to the cathode of the tube 35, the voltage as derived from the upper half 40b of the winding 40a is 180° out of phase with respect to the voltage derived from the lower half 40c of the winding 40a. The phase-shifting network comprising the resistor 51 and the condenser 54 produces a small change in this phase relationship such that the actual grid cathode voltage of the tube lags the anode-cathode voltage by a phase angle of somewhat less than 180°. As a result, and during a small fraction of each alternate half-cycle of the voltage appearing across the transformer secondary winding 40a both, the anode and the grid of the tube 34 become positive with respect to the cathode of the tube. During each such short interval, space current traverses the tube over a circuit which includes the upper section 50b of the resistor 50 and the lower section 40c of the transformer secondary winding 40a. Soon, however, the voltage across this winding section reverses its polarity, and space current flow through the tube 35 is arrested. Thus, during each alternate half-cycle of the voltage appearing across the winding 40a the tube 35 conducts only during approximately the short fraction of the half-cycle interval when both the anode and the grid of the tube are positive with respect to the cathode thereof. This interval may, within limits, be adjusted as desired by appropriate changes in the constants of the circuit elements 51 and 54. The periodicity or rate at which the current pulses through the tube are produced is obviously determined by the input frequency to the transformer 40, this rate being exactly 50 or 60 pulses per second in the illustrated arrangement, depending upon whether the switch 39 is set to connect the primary winding of the transformer 40 to the 50-cycle voltage source 48 or the 60-cycle voltage source 32.

From the above explanation, it will be understood that short voltage pulses are caused to appear across the section 50b of the resistor 50 at a periodic rate of either 50 or 60 pulses per second through the action of the triggering circuit described above. The R–C network comprising the resistor 50 and the shunt connected condenser 53 differentiates this voltage to produce a voltage of still shorter duration across the upper section 50c of the resistor 50 which is included in the grid-cathode biasing circuit of the tube 34. The manner in which this differentiating action is produced within the circuit 50, 53 is well understood in the art. It only need be stated here that the resulting sharply peaked voltage pulse appearing across the resistor section 50c is so poled as to drive the grid of the tube 34 positive with respect to the cathode of this tube for an extremely short interval during which the pulse is started. In the illustrated arrangement and for reasons more fully explained below, each voltage pulse developed across the resistor section 50c to render the tube 34 conductive must not exceed in duration a time interval substantially equal to that during which condenser 47 maintains reversed polarity, while it is being charged for the succeeding cycle. To summarize, therefore, it will be seen that the pulsing tube 34 is rendered conductive at a pulse rate of either 50 or 60 pulses per second.

Figure 2:
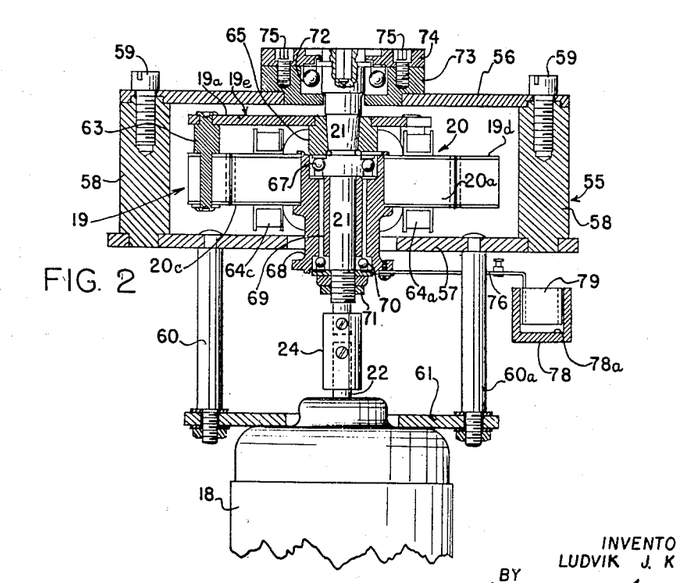
Fig. 2 is a side view, partially in section, illustrating the mechanical construction of the synchronizing device embodied in the driving equipment shown in Fig. 1.
Figure 3:
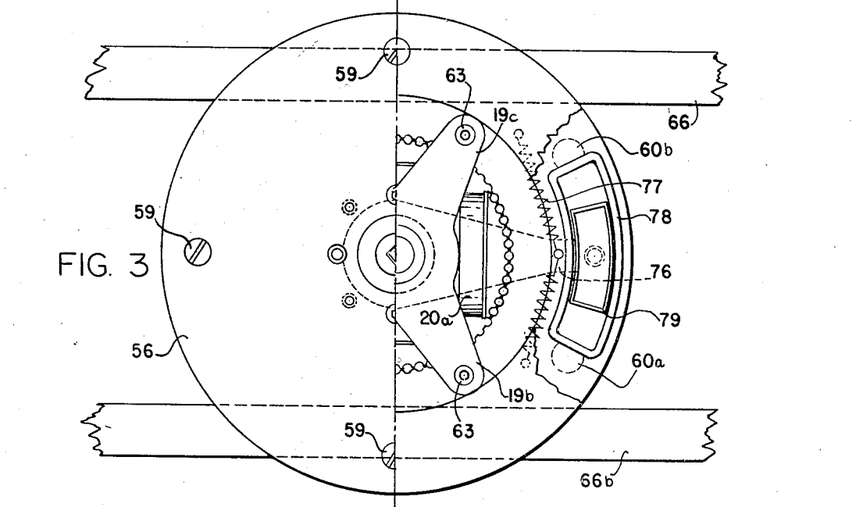
Fig. 3 is a top plan view of the device shown in Fig. 2.
Figure 4:
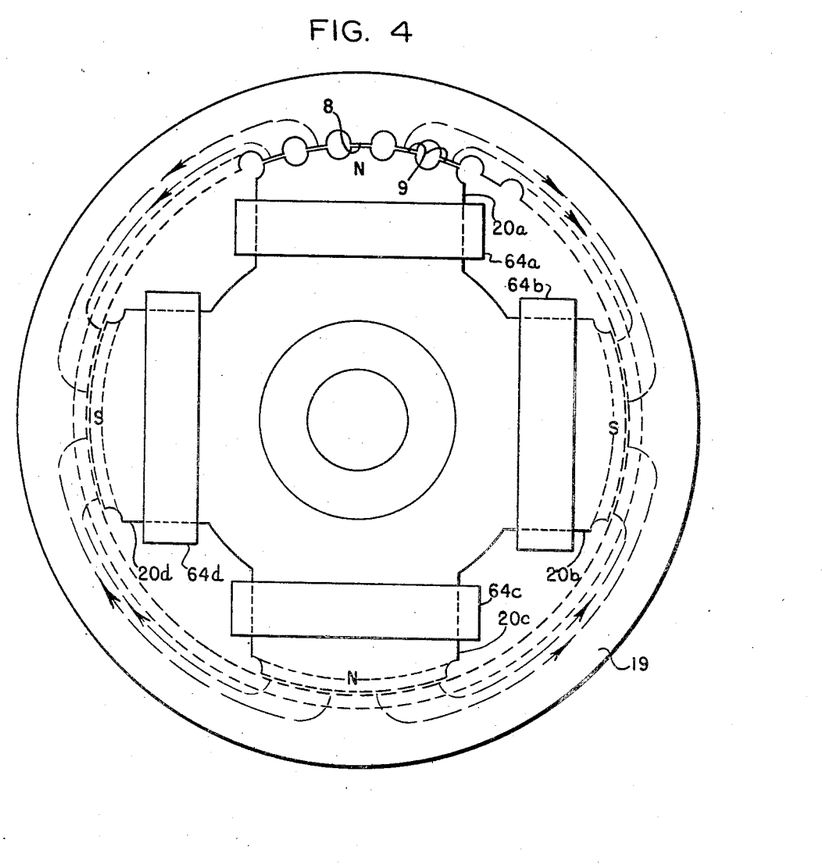
Fig. 4 is a diagrammatic plan view illustrating the magnetic circuit of the device shown in Figs. 2 and 3.

Referring now more particularly to the structural arrangement of the synchronizing device 17, it is pointed out above that this device comprises a rotor structure 19 and a stator structure 20 upon which the winding 64 is carried. As best shown in Figs. 2, 3 and 4 of the drawings, these structures are rotatably supported for independent rotary movement by a frame 55 which may, in turn, be supported by spaced apart supporting members 66a and 66b, and is comprised of two plates 56 and 57 held in spaced apart relationship axially on the shaft 21 by means of spacing posts 58. These posts are suitably anchored to the plate 57 and have the opposed plate 56 assembled thereon by means of assembly screws 59. The frame structure thus provided is also utilized to support the adjustable speed motor 18. To this end, a third supporting plate 61, fabricated or otherwise fixedly connected to the end bell of the motor 18, is supported from the plate 57 by means of spacing posts 60. The rotor structure is comprised of a ring-shaped core 19d made up of soft iron laminations which are clamped together by means of supporting posts 63 spaced around the circumference thereof and respectively mounted upon the arms 19a, 19b and 19c of a star-shaped supporting member 19e. This member is supported at its center upon a hub 65 which is mounted upon the shaft 21 for rotation therewith. Thus, the rotor structure 19 is fixedly supported for rotation with the shaft 21.

The stator structure 20 is made up of a stack of soft iron laminations and comprises four-pole pieces 20a, 20b, 20c and 20d equi-angularly spaced apart around the shaft 21. The pole piece laminations are fixedly upon and radiate from a hub member 68 which is bearing mounted upon the shaft 21 by means of two ball-bearing assemblies 67 and 70 held in spaced apart relationship within the hub 68 by means of a spacing sleeve 69. The bearings 67 and 70, the hub 68 and the sleeve 69 are clamped against the illustrated tapered segment 21a of the shaft 21 by means of assembly nuts 71 threaded onto the lower end of the shaft 21. With this structural arrangement, the stator structure 20 is rotatably supported by the shaft 21 but may be restrained against rotation without interfering with the rotation of this shaft or the rotor structure 19. The shaft 21 is in turn rotatably supported by the end bearing of the motor 18 and a bearing assembly carried by the frame plate 26. This assembly comprises a pair of holding members 73 and 74 which are held together by means of assembly screws 75 and the first of which is fixedly mounted within a central opening through the frame plate 56. These two holding members have a cavity therebetween within which a ball-bearing assembly 72 is provided for rotatably supporting the upper end of the shaft 21. This shaft has a squared opening in the upper end thereof for receiving the squared end of a shaft section through which a connection is made with the coupling sleeve 23.

As indicated above, each of the four-pole pieces 20a, 20b, 20c and 20d carries one of the four coils of which the winding 64 is comprised. These coils are indicated at 64a, 64b, 64c and 64d as being respectively supported by the pole pieces 20a, 20b, 20c and 20d. They are so wound that alternate ones of the pole pieces are of different magnetic polarity. Thus, the pole face ends of the opposed pole pieces 20a and 20c may be north magnetic poles whereas the pole face ends of the intervening pole pieces 20b and 20d may be south magnetic poles. With this winding arrangement, flux produced through energization of the winding 64 is caused to enter the rotor ring 19d through the pole face ends of the two north magnetic pole pieces 20a and 20c, and to return to the stator structure through the south pole face ends of the two pole pieces 20b and 20d, different portions to the flux traversing four different sectors of the rotor ring 19d. For the purpose of utilizing the periodic energization of the winding 64 to produce the required synchronizing torque, teeth are provided around the inner periphery of the rotor ring 19d and at the pole face ends of the four pole pieces 20a, 20b, 20c and 20d. The rotor ring teeth and the stator pole piece teeth are of identical angular pitch. In the illustrated arrangement wherein it may be desired to produce synchronous movement of the shaft 21 at a base speed of 50 R. P. M. and at higher speeds which are integer multiples of this base speed the rotor ring 19d is provided with 60 teeth around the inner periphery thereof. With this toothed arrangement of the rotor ring 19d and the pole face ends of the four pole pieces, it will be understood that the reluctance of the air gap separating the pole face end of each pole piece from the rotor ring is periodically varied between maximum and minimum values at a rate of 60 variations for each revolution of the shaft 21 when this shaft is being driven at a constant speed.

As will be evident from the following detailed consideration of the manner in which the described equipment operates, so long as the shaft 21 is operating at a selected predetermined synchronous speed and at fixed load, the angular position of the stator structure 20 remains unchanged. Any transient change in the speed of rotation of the shaft 21 and the rotor structure 19, however, tends to produce rotation of the stator structure 20. In order to damp out such transient speed changes and to prevent hunting of the stator structure 20, a damping assembly is provided which is connected between the stator structure and the supporting frame, and comprises a damping vane 79 carried by an arm 76 extending from the hub 69 and movable within an arcuate fluid channel 78a of a fluid reservoir 78. This reservoir is supported between the two spacing posts 60a and 60b and is filled with a high viscosity liquid, such, for example, as heavy oil, to damp out movement of the vane 79 which may be transmitted thereto in response to transient tendencies to change the speed of rotation of the rotor structure 19. Springs 77 connected between the plate 57 and the end of the arm 76 function normally to maintain the vane 79 centered in the channel 78a.

Briefly to consider the operation of the described apparatus, it may be assumed that this apparatus is to be used in calibrating the tachometer 10 over its entire speed range of from 0 to 5000 R. P. M. at calibrating points of 100, 200, 300, etc., revolutions per minute. In order to initiate operation of the pulse generator 33 and operation of the motor 18, the on-off switch 31 is moved to its closed circuit position to complete obvious circuits for energizing the identified motor and the primary windings of the two filament transformers 41 and 42 in parallel. Thus rotation of the motor 18 at the speed determined by the setting of the auto-transformer 30 is initiated concurrently with heating of the cathodes respectively provided in the two tubes 34 and 35. Also incident to closure of the switch 31, a circuit is completed for energizing the heating coil 37b of the time delay relay 37 in parallel with the primary winding of the filament transformer included in the full wave rectifier 36. Approximately 5 minutes are required for heating the bimetallic element 37a before this element operates to close the contacts 37c and thus complete a circuit for delivering current to the primary winding of the anode transformer provided in the rectifier 36. The purpose of the 5 minutes delay interval between application of voltage to the filaments and anodes of the rectifier tubes included in the rectifier 36 is to prevent destruction of the mercury filled rectifier tubes which are used in the rectifier 36. After the time delay relay 37 functions to apply anode voltage to the tubes of the full wave rectifier 36, the desired output voltage is developed across the output terminals 36c of this rectifier to initiate the operation of the pulse generator 33. In this regard it will be understood that immediately the cathode of the tube 35 is heated to an electron emission temperature, voltage pulses are developed across the section 50c of the resistor 50 at the rate determined by the setting of the selector switch 39. In the present case wherein the tachometer 10 is to be calibrated at points spaced apart by 100 R. P. M., the 50-cycle voltage source 38 is connected to the transformer 40 through the switch 39 to cause the described voltage pulses to appear across the resistor section 50c at a rate of 50 pulses per second. Immediately the rectified output voltage appears across the output terminals of the rectifier 36, the condenser 47 is charged by the voltage appearing between the adjustable taps 44a and 46a along the two resistors 44 and 46. With this condenser charged, current is caused to traverse the winding 64 carried by the stator structure 20 each time the tube 34 is rendered conductive. More specifically, during each short conductive interval of the tube 34 which is produced when a voltage pulse is developed across the resistor section 50c, an oscillatory circuit is formed which includes the condenser 47 and the winding 64 in parallel. If, therefore, the tube 34 were bi-directionally conductive, a damped oscillatory current would be developed in this circuit to traverse the winding 64. However, the tube 34 is unidirectionally conductive in that it only conducts during an interval when its anode is positive with respect to its cathode. Accordingly, after the first positive half-cycle of the oscillatory current which occurs after the grid of the tube 34 is driven positive with respect to the cathode thereof, current flow through the winding 64 is arrested. The duration of the current pulse is thus determined solely by the constants of the L-C oscillatory circuit, which constants are so chosen as to prevent the pulse from persisting for more than 200 microseconds. During the current pulse period, and for a short interval thereafter, a heavy current is obviously caused to traverse the resistor section 44b, thereby to increase the negative bias voltage across this resistor section. Thus the grid of the tube 34 is driven sharply negative with respect to the cathode thereof immediately the triggering voltage pulse across the resistor section 50c terminates. In this regard it will be apparent that at the end of the current pulse through the tube 34 the condenser 47 is reversely charged such that the upper terminal becomes negative with respect to the lower terminal thereof. Thereafter, the condenser is recharged from the resistor network 44, 45, 46 to again establish a positive polarity for the upper terminal thereof. It is imperative, therefore, that the triggering pulse appearing across the resistor section 50c be terminated before the condenser 47 in charging, begins to assume its proper polarity of positive at the top terminal and negative at the bottom terminal, since otherwise, a second or spurious current pulse would be transmitted through the winding 64. This explains the reason for so arranging the triggering circuit that extremely short voltage pulses are developed across the resistor section 50c. It will thus be apparent that during continued operation of the pulse generator 33 extremely short current pulses are delivered to the winding 64 at a rate of 50 pulses per second. The power delivered to the winding 64 is entirely adequate to produce the torque required to maintain rotation of the rotor structure 19 at the selected synchronous speed.

As indicated above, the indicated speed of the test tachometer 10 should be exactly twice the speed at which the shaft 16 of the generator 13 is driven. Accordingly, rotation of the shaft 16 at a speed of 50 R. P. M. is necessary to produce an indicated speed of 100 R. P. M. With the rotor structure rotating at a speed of 50 R. P. M., a full tooth displacement is produced between the teeth 8 and 9 of the rotor and stator structures each 1/50 of a second. Stated otherwise, 50 tooth displacements between the rotor and stator structure occur each second when the rotor structure 19 is operating at a speed of 50 R. P. M. Thus, the rate of tooth displacement between the rotor and stator structure at the base speed of 50 R. P. M. equals the rate at which the current pulses are delivered to the winding 64. The character of the torque developed as a result of these current pulses depends upon the sense of departure of the actual speed of rotation of the rotor structure 19 from the synchronous base speed of 50 R. P. M. Thus, if the actual speed is slightly low, the pulses occur when the teeth of the rotor structure lag full registration with the teeth of the stator structure. Therefore, in tending to pull the teeth into full registration to minimize the reluctance of the air gaps between the rotor and stator structures, the flux traversing these structures produces an accelerating torque of sufficient magnitude to boost the speed of operation of the rotor structure exactly to the synchronous speed of 50 R. P. M. On the other hand, if the motor 18 is tending to drive the rotor structure at a speed exceeding the synchronous value of 50 R. P. M. the rotor structure teeth 8 lead full registration with the stator structure teeth 9 during each pulse interval. As a consequence, decelerating torque is produced by the flux seeking to bring the teeth into full registration and thus establish the paths of minimum reluctance between the rotor and stator structures. Here again, the decelerating torque developed is sufficient to sustain operation of the rotor structure and connected parts exactly at the desired synchronous speed.

After the test tachometer 10 has been checked at the indicated calibration point of 100 R. P. M. through synchronous operation of the alternator 13 at a speed of 50 R. P. M. in the manner just described, the tap 30a may be adjusted along the winding of the auto-transformer 30 to increase the speed of operation of the alternator 13 to a value of 100 R. P. M. and thus provide for an indicated speed of 200 R. P. M. by the test tachometer 10. It will be seen that with the rotor structure 19 operating at a speed of exactly 100 R. P. M., it will rotate through an angle defined by two rotor structure teeth 8 during the pulse separation interval of 1/50 of a second. Thus the current pulses delivered to the winding 64 will occur during at least partial registry of the stator structure teeth 9 with alternate ones of the rotor structure teeth 8, with the result that the synchronizing torque required to maintain operation of the rotor structure at the synchronous speed of 100 R. P. M. is produced. The tooth displacement which occurs during succeeding current pulses is obviously increased step by step as the speed of rotation of the rotor structure and associated parts is increased in steps of 50 R. P. M. Thus, at the maximum speed of 2500 R. P. M., representing an indicated speed of 5,000 R. P. M., an angular displacement equal to the angle defined by 50 teeth of the rotor structure, will occur between the rotor and stator structures during succeeding current pulses. The importance of delivering high power pulses of exceedingly short duration to the winding 64 thus becomes apparent. More specifically, if alternating current of a frequency of 50 cycles per second and of sinusoidal wave form were supplied to the stator winding 64, it would be found that rotor structure would lock into synchronism readily at a speed of 50 R. P. M., but would not lock into synchronism at any other multiple speed. However, by making each current pulse period less than the time required to produce a single tooth tip displacement between the rotor and stator structures when the rotor is operating at the maximum speed of 2500 R. P. M., the developed synchronizing torque is substantially equal at all integer multiple speeds of 50 R. P. M. over the full speed range extending from 50 to 2500 R. P. M. As indicated above, the duration of each high current pulse delivered by the pulse generator 33 to the winding 64 is somewhat less than 200 microseconds, which time interval equals the time interval required to produce a tooth tip angle of displacement between the rotor and stator structures when the rotor structure is operating at the top synchronous speed of 2500 R. P. M.

As indicated above, synchronous equipment of the character under consideration presents numerous combinations of electromagnetic mechanic coupling, and thus provides equally numerous possibilities for both transient and self-maintained oscillations of the structure. To effectively damp out the transient effects which may occur at the instant the rotor structure is locked into a synchronous speed, or the transient effects which may occur in response to a sudden change in load or voltage, and to effectively prevent the building up of self-sustained oscillations or hunting of the mechanical system, the described damping facilities including the frame 79 moving within the liquid filled channel of the reservoir 78 are provided. Thus it will be noted that the stator structure 20 is not intended to remain perfectly stationary at all times, but is designed to move through a limited angle under comparatively no restraint except for that imposed by the relatively weak coil springs 77 acting against opposite sides of the vane 79 and the true viscous or damping resistance produced by movement of the vane 79 within the liquid filled channel 78a of the member 78. With this arrangement any sudden change in the forces acting between the rotor and stator structures is primarily manifested as is movement of the stator structure 20. Such movement of the stator structure is yieldingly opposed by the spring and fluid forces acting against the vane 79, movement of this vane being continued until a state of equilibrium is reached. It will thus be apparent that transient forces acting to produce non-synchronous relative movement between the rotor and stator structures result in movement of the stator structure which is damped out through the action of the damping vane 79 and associated parts. It will be noted that the moment of inertia of the rotor structure 19, the rotor of the motor 18 and the rotor of the alternator 15 is considerably greater than that of the stator structure 20. Consequently, any abnormal transient pulse occasioned by a disturbance of any character will cause a considerable greater acceleration of deceleration of the stator structure 20 than of the rotor structure 19, and thus will be effectively damped.

From the foregoing explanation it will be understood that with the selector switch 39 connected to the terminals of the 50-cycle alternating voltage source 38, current pulses are delivered to the winding 64 at a periodic rate of 50 pulses per second. It will also be understood that when the selector switch 39 is operated to bridge the primary winding of the transformer 40 across the terminals of the source 32, current pulses are delivered to the winding 64 at a rate of 60 pulses per second and that the persistency or duration of each pulse is the same as that obtained during 50 pulses per second generation. When the pulse generator 33 is set to deliver current pulses to the winding 64 at a rate of 60 pulses per second, lock in of the rotor structure will occur at a base speed of 60 R. P. M. and at each integer multiple of this base speed, i. e., 120 R. P. M., 180 R. P. M., etc. In this case, the precision of the pulse frequency is determined by the frequency stability of the voltage source 32. In frequency controlled power systems, the mean value of frequency is exactly 60 cycles per second. The instantaneous value will be found to depart slightly from this value on an occasional basis. It has been observed, however, that the departure from the exact value of 60 cycles per second seldom exceeds ¼ of one per cent. It will be noted by contrasting the multiple speed patterns obtained respectively with 50 and 60 cycle control voltage sources, that certain of the synchronous speeds are the same for both 50 and 60 cycle excitation of the transformer 40, i. e., speeds of 300, 600, 900, 1200, 1500, 1800, 2100 and 2400 R. P. M. This coincidence of synchronous speed points is useful in checking the instantaneous value of power line frequency, the 50 cycle tuning fork controlled source 38 being used as the standard with which the 60 cycle source is compared.

When desired, the delivery of synchronizing current pulses to the winding 64 may be arrested by the simple expedient of restoring the selector switch 39 to its off position. In response to this operation, the triggering circuit comprising the tube 35 discontinues its operation, with the result that the control grid of the tube 34 is held at a negative potential with respect to the cathode thereof to prevent discharge of the condenser 47 through the winding 64. The delivery of synchronizing current pulses to the winding 64 may also be arrested by actuating the switch 44' to its off position, thereby to open the circuit for delivering current to the anode transformer of the rectifier 36. De-energization of the various circuit components embodied in the pulse generator 33 will obviously be produced by operation of the on-off switch 31 to its off position.

As indicated above, the gas filled tube 48 is connected in shunt with the winding 64 to visually indicate synchronous operation of the rotor structure 19 at the predetermined base speed or any integer multiple thereof. In this regard it will be apparent that the tube 48 is illuminated for the duration of each pulse delivered to the winding 64. By appropriately arranging vertical indicating lines 48a around the periphery of the rotor structure 19, therefore, standing line indications may be produced when the rotor structure is operating exactly at the different synchronous speeds. In other words, stroboscopic observation of the rotor structure operation may be relied upon to ascertain whether or not this structure is operating at a selected synchronous speed. Another method by which synchronous rotation of the rotor structure 19 at a selected synchronous speed may be observed is that of moving the tap 30a back and forth along the winding of the autotransformer 30 and observing the action of the pointer provided in the master tachometer 7. Failure of this pointer to move when the top 30a is moved through a small portion of its operating range, indicates that the rotor structure 19 is locked in at a synchronous speed.

From the foregoing explanation it will be clearly understood that the synchronizing device 17 and associated pulse generator 33 may be easily and simply controlled to maintain rotation of the shaft 16 at any one of a plurality of different predetermined speeds. In this regard it is noted that the synchronous power produced by the device 17 is several times greater than that required to keep the rotor structure locked either at the base speed or at one of the integer multiples thereof under normal variations in voltage and load conditions. In fact, the synchronous power developed is alone sufficient to rotate the rotor structure at the lower synchronous speeds under full load conditions, but not at the higher speeds. It will be seen, therefore, that the small adjustable speed motor 18 serves two functions. First, it enables the operator to bring the rotor structure 19 up to the approximate synchronous speed desired, prior to locking in of this structure exactly at the synchronous speed by the application of the synchronizing pulses to the winding 64. Secondly, the motor 18 supplies the added torque necessary to maintain the rotor structure in synchronism when operating under load at the higher synchronous speeds. Thus, depending upon the setting of the tap 30a along the winding of the auto-transformer 30, the synchronous motor 18 supplies either the accelerating or decelerating torque necessary to maintain the rotor structure operating at the desired synchronous speed. Since the major portion of the torque is supplied by the adjustable speed motor 18 at the higher synchronous speeds, the rotor structure 19 may step out of synchronism in case the switch 6 is operated to disconnect the motor of the master tachometer 7 from the output terminals of the alternator 13. If, however, the tap 30a is first moved slightly in the direction of decreased speed of operation of the motor 18, thereby partially to correct for the subsequent decrease in load torque occurring at the instant the master tachometer 7 is disconnected from the alternator 13, such disconnection may be accomplished without causing the rotor structure 19 to step out of synchronism.

While there has been described what is at present considered to be the preferred embodiment of the invention, it will be understood that various modifications may be made therein which are within the true spirit and scope of the invention as defined in the appended claims.

I claim:

1. A device for producing driving or synchronizing torque, comprising relatively rotatable rotor and stator structures, means providing flux paths between said structures having reluctances which periodically vary between maximum and minimum values at predetermined integer multiple rates in response to relative rotation of said structures at different predetermined integer multiple speeds, a source of periodic current pulses having a pulse periodicity rate equaling the rate at which said reluctance varies during relative rotation of said structures at the lowest of said speeds, means for limiting the pulse persistence interval not to exceed the minimum reluctance persistence interval of said paths at the maximum speed of relative rotation of said structures, and a winding energized by said pulses to produce periodic flux traversal of said paths, whereby rotation of said rotor structure exactly at any selected one of said speeds is sustained by the torque resulting from a time displacement between the periods of flux traversal of said paths and certain recurrent intervals of minimum reluctance of said paths.

2. A device for producing driving or synchronizing torque, comprising relatively rotatable rotor and stator structures, means providing flux paths between said structures having reluctances which periodically vary between maximum and minimum values at predetermined integer multiple rates in response to relative rotation of said structures at different predetermined integer multiple speeds, means for generating periodic current pulses having a pulse periodicity directly but differently related to said predetermined speeds, means for limiting the pulse persistence interval not to exceed the minimum reluctance persistence interval of said paths at the maximum predetermined speed of relative rotation of said structures, and a winding energized by said pulses to produce periodic flux traversal of said paths, whereby rotation of said rotor structure exactly at any selected one of said predetermined speeds is sustained by the torque resulting from a time displacement between the periods of flux traversal of said paths and certain recurrent intervals of minimum reluctance of said paths.

3. A device for producing driving or synchronizing torque, comprising relatively rotatable rotor and stator structures, means providing flux paths between said structures having reluctances which periodically vary between maximum and minimum values at predetermined integer multiple rates in response to relative rotation of said structures at different predetermined integer multiple speeds, means for generating current pulses having a pulse periodicity rate equaling the rate at which said reluctance varies during relative rotation of said structures at the lowest of said speeds, means for limiting the pulse persistence interval not to exceed the minimum reluctance persistence interval of said paths at the maximum speed of relative rotation of said structures, and a winding energized by said pulses to produce periodic flux traversal of said paths, whereby rotation of said rotor structure exactly at any selected one of said speeds is sustained by the torque resulting from a time displacement between the periods of flux traversal of said paths and certain recurrent intervals of minimum reluctance of said paths.

4. A device for producing driving or synchronizing torque, comprising relatively rotatable rotor and stator structures, supporting means rotatably supporting said structures, means providing flux paths between said structures having reluctances which periodically vary between maximum and minimum values at a predetermined rate in response to relative rotation of said structures at a predetermined speed, a source of periodic current pulses having a periodicity directly related to said predetermined speed, a winding energized by said pulses to produce periodic flux traversal of said paths, whereby rotation of said rotor structure exactly at said predetermined speed is sustained by the torque resulting from a time displacement between the periods of flux traversal of said paths and certain recurrent intervals of minimum reluctance of said paths, and damping means interconnecting said stator structure and said supporting means to minimize and damp out transient relative movements of said structures.

5. A device for producing driving or synchronizing torque, comprising relatively rotatable rotor and stator structures, supporting means rotatably supporting said structures, means providing flux paths between said structures having reluctances which periodically vary between maximum and minimum values at predetermined multiple rates in response to relative rotation of said structures at different predetermined integer multiple speeds, means for generating periodic current pulses having a pulse periodicity directly but differently related to said predetermined speeds and having a pulse persistency interval not greater than the minimum reluctance persistence interval of said paths at the maximum predetermined speed of relative rotation of said structures, a winding energized by said pulses to produce periodic flux traversal of said paths, whereby rotation of said rotor structure exactly at any selected one of said speeds is sustained by the torque resulting from a time displacement between the periods of flux traversal of said paths and certain recurrent intervals of minimum reluctance of said paths, and damping means interconnecting said stator structure and said supporting means to minimize and damp out transient relative movement of said structures.

6. In combination with a rotatable element and non-synchronous means for driving said element either at a predetermined base speed or at any one of a plurality of higher speeds which are integer multiples of said base speed, the apparatus for sustaining rotation of said element exactly at any selected one of said speeds which comprises a source of periodic pulses having a periodicity which is related in time to said predetermined base speed, means controlled by said pulses for delivering to said element the accelerating or decelerating torque required to sustain rotation of said element at one of said speeds, and means for so limiting the duration of said pulses that said accelerating or decelerating torque is produced at any selected one of said speeds.

7. In combination with a rotatable element and non-synchronous means for driving said element either at a predetermined base speed or at any one of a plurality of higher speeds which are integer multiples of said base speed, the apparatus for sustaining rotation of said element exactly at any selected one of said speeds which comprises relatively rotatable rotor and stator structures, a torque transmitting connection between said rotor structure and said element, said structures being provided with relatively rotatable teeth which are periodically brought into registry at a rate determined by the selected speed of rotation of said element, whereby a predetermined interval elapses in producing a tooth tip angle of relative rotation between said structures when said element is rotating at the highest one of said speeds, a winding carried by one of said structures, means for periodically generating current pulses at a rate which is directly related to said base speed, means for so limiting each current pulse that it persists for an interval not exceeding said predetermined interval, and means for delivering said current pulses to said winding, whereby rotation of said element exactly at a selected one of said speeds is sustained by the synchronizing torque resulting from a non-synchronous relationship between the occurrence of said pulses and full registration of said teeth.

8. In combination with a rotatable element and non-synchronous means for driving said element, the apparatus for sustaining rotation of said element exactly at a predetermined speed which comprises relatively rotatable rotor and stator structures, a torque transmitting connection between said rotor structure and said element, stationary supporting means for said stator structure, said structures being provided with relatively rotatable teeth which are periodically brought into registry at a rate determined by the speed of rotation of said element, a winding carried by one of said structures, means for periodically delivering current pulses to said winding at a rate such that the occurrence of said pulses is synchronized with full registration of said teeth only when said element is driven by said non-synchronous means exactly at said predetermined speed, whereby rotation of said element exactly at said predetermined speed is sustained by the synchronizing torque resulting from a non-synchronous relationship between the occurrence of said pulses and full registration of said teeth, said stator being driven by said rotor in response to transient changes in the speed of said element, and damping means interconnecting said supporting means and said stator to damp out said transient changes in the speed of said element.

9. In combination with a rotatable element and non-synchronous means for driving said element either at a predetermined base speed or at any one of a plurality of speeds which are integer multiples of said base speed, the apparatus for sustaining rotation of said element exactly at any selected one of said speeds which comprises relatively rotatable rotor and stator structures, a torque transmitting connection between said rotor structure and said element, stationary supporting means for said stator structure, said structures having relatively rotatable teeth which are periodically brought into registry at a rate determined by the selected speed of rotation of said element, a winding carried by one of said structures, and means for periodically delivering current pulses to said winding at a rate such that the occurrence of said pulses is synchronized with full registration of said teeth only when said element is driven by said non-synchronous means exactly at a selected one of said speeds, whereby rotation of said element exactly at a selected one of said speeds is sustained by the synchronizing torque resulting from a non-synchronous relationship between the occurrence of said pulses and full registration of said teeth and rotating torque is transmitted to said stator structure in response to transient changes in the speed of said element, and damping means interconnecting said supporting means and stator structure to damp out said transient changes in the speed of said element.

10. The method of producing relative rotation between two relatively rotatable rotor and stator structures either at a predetermined synchronous base speed or any one of a plurality of synchronous speeds which are integer multiples of said base speed by means of relatively rotatable teeth respectively carried by said structures and an exciting winding carried by one of said structures, which comprises generating current pulses at a rate directly related to said base speed, limiting the duration of each current pulse not to exceed each interval of tooth registry of said relatively rotatable teeth when said structures are relatively rotated at the highest of said synchronous speeds, and delivering said current pulses of limited duration to said winding.

11. The method of producing relative rotation between two relatively rotatable rotor and stator structures either at a predetermined synchronous base speed or any one of a plurality of synchronous speeds which are integer multiples of said base speed by means of relatively rotatable teeth respectively carried by said structures and an exciting winding carried by one of said structures, which comprises driving one of said structures to produce relative rotation between said structures approximately at any selected one of said speeds, generating current pulses at a rate directly related to said base speed, limiting the duration of each current pulse not to exceed each interval of tooth registry of said relatively rotatable teeth when said structures are relatively rotated at the highest of said synchronous speeds, and delivering said current pulses of limited duration to said winding, whereby flux traversal of said relatively rotatable teeth is periodically produced to develop synchronizing torque regardless of the selected speed of relative rotation of said structures.

LUDVIK J. KOCI.

REFERENCES CITED

The following references are of record in the file of this patent:

UNITED STATES PATENTS

| Number | Name | Date |
|---|---|---|
| 1,753,331 | Clokey | Apr. 8, 1930 |
| 1,763,909 | Stoller et al. | June 17, 1930 |
| 2,066,680 | Gieskieng et al. | Jan. 5, 1937 |